United States Patent [19]

Watanabe

[11] Patent Number: 5,722,322
[45] Date of Patent: Mar. 3, 1998

[54] EMULSION INK FOR STENCIL PRINTING PROCESS

[75] Inventor: Hideo Watanabe, Tokyo, Japan

[73] Assignee: Riso Kagaku Corporation, Tokyo, Japan

[21] Appl. No.: 608,299

[22] Filed: Feb. 28, 1996

[30] Foreign Application Priority Data

| Feb. 28, 1995 | [JP] | Japan | 7-040600 |
| Mar. 1, 1995 | [JP] | Japan | 7-042068 |
| Mar. 9, 1995 | [JP] | Japan | 7-049999 |

[51] Int. Cl.$^6$ .............................. C09D 11/02; B41M 1/12
[52] U.S. Cl. ........................... 101/129; 101/119; 101/491; 106/31.26
[58] Field of Search ........................... 101/114, 119, 101/123, 129, 491; 106/22 A, 23 A, 27 R, 30 R

[56] References Cited

U.S. PATENT DOCUMENTS

| 3,577,915 | 5/1971 | Thompson | 101/129 |
| 3,656,428 | 4/1972 | Duncan | 101/129 |
| 3,872,044 | 3/1975 | Hervey et al. | 101/114 |
| 4,561,789 | 12/1985 | Saito | 101/114 |
| 4,730,556 | 3/1988 | Cobbs, Jr. | 101/129 |
| 5,439,515 | 8/1995 | Kurabayashi et al. | 347/100 |
| 5,487,334 | 1/1996 | Chew et al. | 101/127 |

FOREIGN PATENT DOCUMENTS

| 329026 | 8/1989 | European Pat. Off. . | |
| 529215 | 3/1993 | European Pat. Off. . | |
| 2259225 | 6/1973 | Germany | 101/119 |
| 4-233980 | 8/1992 | Japan . | |
| 5-271592 | 10/1993 | Japan . | |
| WO 93/03103 | 2/1993 | WIPO . | |

*Primary Examiner*—Stephen R. Funk
*Attorney, Agent, or Firm*—Fay, Sharpe, Beall, Fagan, Minnich & McKee

[57] ABSTRACT

The present invention provides a stencil printing process for printing an object to be printed by passing an ink through perforations made in a stencil sheet which has undergone plate-making which includes the following steps: supplying a solid ink capable of causing a phase change into a liquid state at a temperature of 30°–150° C. into a liquid ink having a viscosity of 10–1,000,000 cps with heat during printing; and passing the liquid ink through perforations made in a stencil sheet within a time of 0.001–10 seconds while pressing the stencil sheet against the object to be printed with a pressure of 0.01–10 kg/cm$^2$ so as to transfer the ink onto the object. The invention also provides a water-in-oil (W/O) emulsion ink for stencil printing containing 10–90% by weight of an oil phase and 90–10% by weight of an aqueous phase, wherein the oil phase includes a compound capable of causing a phase change from a solid state to a liquid state by being heated to a temperature of 30°–100° C. According to the present invention, offsetting and seeping-through of ink can be prevented while reducing time required for drying, and in addition, side-leakage of ink and end-leakage of ink occurable during printing can be prevented.

6 Claims, 2 Drawing Sheets

A: Conventional emulsion ink

B: Emulsion ink containing a phase-changeable component as an oil phase component C: Emulsion ink containing a phase-changeable component as an oil phase component and a reversibly temperature-sensitive gel polymer as an aqueous phase component $\eta_1$: Optimal viscosity for printing 1: Drum
2: Squeezing blade
3: Heater
4: Pressing roller
5: Stencil sheet which has undergone plate-making
6: Printing paper
7: Liquid ink
8: Solid ink A: Conventional emulsion ink B: Emulsion ink containing a phase-changeable component as an oil phase component C: Emulsion ink containing a phase-changeable component as an oil phase component and a reversibly temperature-sensitive gel polymer as an aqueous phase component $\eta_1$: Optimal viscosity for printing

EMULSION INK FOR STENCIL PRINTING PROCESS

BACKGROUND OF THE INVENTION

1. Field of the Invention

The present invention relates to a stencil printing process and to an emulsion ink for stencil printing. More particularly, the invention relates to a stencil printing process and to an emulsion ink for stencil printing which realize quick ink drying, thereby preventing offsetting and seeping-through in resulting prints.

2. Description of the Related Art

Stencil printing is widely performed in a variety of fields since master plates used for printing can be made easily. However, it has the drawback that, when printed materials such as printed paper are touched by hands or fingers, the hands or fingers are dirtied by ink, or if printed papers are superposed one upon another when continuous printing is performed, offsetting of ink occurs. Such problems are caused by ink that takes time to dry after stencil printing is performed. These phenomena are significant particularly when sheets to be cut into post cards are stencil-printed, as such sheets have poor ink permeability. These phenomena are attributed to, in the case where emulsion inks are used, the ink drying mechanism which includes permeation of the oil phase of ink and evaporation of the aqueous phase of ink. Thus, the use of papers or like materials having poor ink permeability cannot avoid involving considerably slow ink drying.

In order to solve the above drawbacks, several processs have been proposed, which include a process in which thermosetting components are included in the oil and/or aqueous phase(s) (Japanese Patent Application Laid-open (kokai) Nos. 6-128516, 6-172691, etc.) and a process in which fine solid particles are incorporated into an emulsion ink (Japanese Patent Application Laid-open (kokai) No. 6-116525, etc.). However, satisfactory results have not yet been obtained.

Previous emulsion inks for stencil printing have often caused changes in viscosity depending on the temperature of the environment in which they are used, and for example, they become softened when used at high temperatures, causing seeping-through, side-leakage of ink, and end-leakage of ink (a phenomenon in which ink is pressed out from the tail end of a stencil sheet).

SUMMARY OF THE INVENTION

Accordingly, an object of the present invention is to solve the above-mentioned problems entailed by the prior art and to provide a stencil printing process and an emulsion ink for stencil printing which realize improved ink drying so as to prevent offsetting and seeping-through in prints and to prevent occurrence of side-leakage of ink and end-leakage of ink.

The persent invention has the following aspects;

(1) A stencil printing process for printing an object to be printed by passing an ink through perforations made in a stencil sheet which has undergone plate-making, comprisingthe following steps:

rendering a solid ink capable of causing a phase change into a liquid state at a temperature of 30°–150° C. into a liquid ink having a viscosity of 10–1,000,000 cps with the application of heat; and passing the liquid ink through the perforations made in the stencil sheet within a time of 0.001–10 seconds while pressing the stencil sheet against the object to be printed with a pressure of 0.01–10 kg/cm$^2$ so as to transfer the ink onto the object.

(2) A stencil printing process according to aspect 1, wherein said solid ink is a water-in-oil (W/O) emulsion ink for stencil printing comprising 10–90% by weight of an oil phase and 90–10% by weight of an aqueous phase, the oil phase containing a compound capable of causing a phase change from a solid state to a liquid state by being heated to a temperature of 30°–100° C.

(3) A stencil printing process according to aspect 1, wherein said solid ink is a water-in-oil (W/O) emulsion ink for stencil printing comprising 10–90% by weight of an oil phase and 90–10% by weight of an aqueous phase, the oil phase containing a compound capable of causing a reversible phase change with the application of heat, and the aqueous phase containing a reversibly temperature-sensitive gel polymer.

(4) A stencil printing process according to aspect 3, wherin said reversibly temperature-sensitive gel polymer causes gelation within the temperature range of 30°–100° C.

(5) A stencil printing process according to aspect 3 or 4, wherein the amount of the reversibly temperature-sensitive gel polymer in the aqueous phase from 0.01–50% by weight calculated to the total weight of the aqueous phase.

(6) A water-in-oil emulsion ink for stencil printing, which comprises 10–90% by weight of an oil phase and 90–10% by weight of an aqueous phase, wherein said oil phase containing a compound capable of causing a phase change from a solid state to a liquid state by being heated to a temperature of 30°–100° C.

(7) A water-in-oil emulsion ink for stencil printing, which comprises 10–90% by weight of an oil phase and 90–10% by weight of an aqueous phase, wherein said oil phase containing a compound capable of causing a reversible phase change with the application of heat, and said aqueous phase containing a reversibly temperature-sensitive gel polymer.

The emulsion ink for stencil printing preferably changes its phase from a solid state to a liquid state by being heated to 30°–100° C., preferably 40°–80° C.

The reversibly temperature-sensitive gel polymer preferably causes gelation within the temperature range of 30°–100° C., preferably 40°–80° C.

Moreover, the amount of the reversibly temperature-sensitive gel polymer in the aqueous phase is preferably from 0.01–50% by weight.

The above and other objects, features, and advantages of the present invention will become apparent from the following description.

DETAILED DESCRIPTION OF PREFERRED EMBODIMENTS

Figure 1:
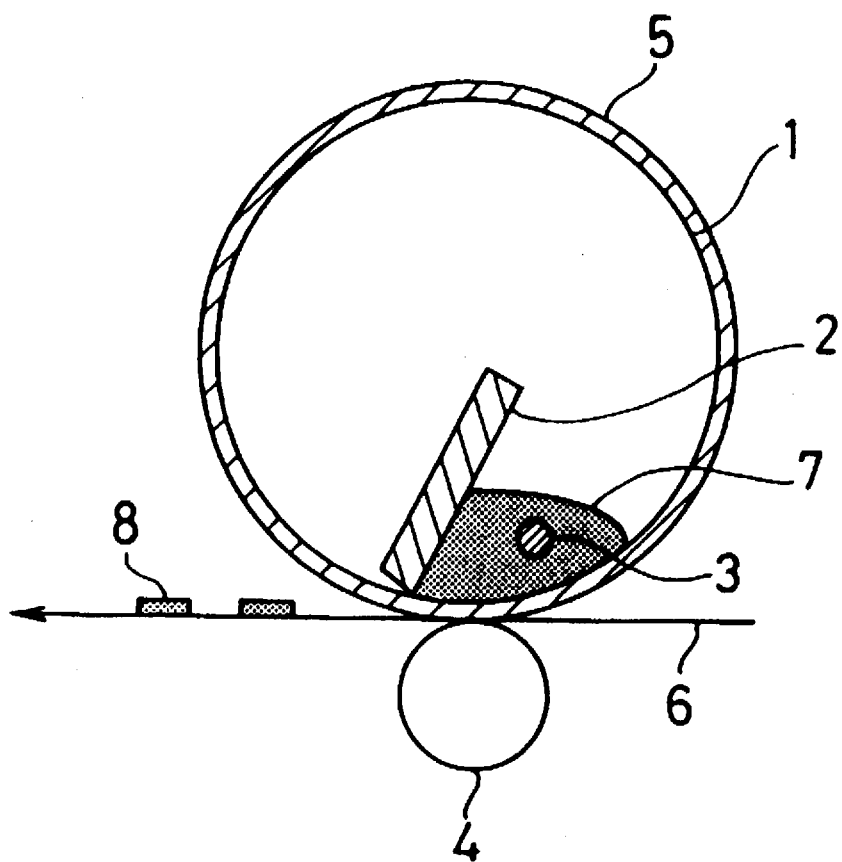
FIG. 1 is a schematic illustration showing the printing section used in the stencil printing process in accordance with one embodiment of the present invention.

In the present invention, the expressions "solid ink capable of causing a phase change into a liquid state" and "a compound capable of causing a phase change from a solid state to a liquid state" are intended to encompass solid inks and compounds which are in a solid state without exhibiting fluidity at a temperature not higher than a certain temperature but then suddenly liquefy to have a fluidity upon being heated to a temperature equal to or higher than a certain temperature, i.e., solid inks and compounds which undergo reversible phase changes. The expression "reversibly temperature-sensitive gel polymer" is intended to mean a compound whose viscosity in a liquid state reversibly elevates while being heated to a temperature not lower than a certain temperature.

According to the process for stencil printing of the present invention, since a solid ink capable of causing a phase change in a reversible manner at a certain temperature is used, the ink can pass through perforations in a stencil sheet in a liquid state with a certain viscosity by the heat applied during stencil printing. Moreover, the liquid ink transferred onto an object which is subjected to printing and immediately changes phase while the liquid ink on the object is conveyed, thus the ink can be adhered to the object in a short period of time. Therefore, even when the resulting prints printed by the process of the present invention are touched by fingers or hands immediately after printing, the ink does not dirty them, and no offsetting occurs even when continuous printing is performed. Moreover, since the ink used in the present invention adheres onto the surface of the object to be printed in a solid state and does not permeate inside of the object unlike the case with previous printing processs, no seeping-through of ink occurs. In addition, according to the present invention, quick phase shifting of the ink from a liquid state to a solid state on printing paper permits printing not only onto normal printing papers or post card papers having poor ink permeability, but also onto objects made of, for example, films and metals.

The ink used for stencil printing in the present invention melts or softens at a temperature of 30°–150° C., preferably 40°–120° C., and changes phase in a reversible manner from a solid state to a liquid state. If the temperature at which phase change occurs is too low, the ink becomes liquefied by the heat transferred from the stencil printing device under operation or by ambient temperature, dirtying the printing device or increasing the risk of side-leakage of ink and end-leakage of ink. On the other hand, if the temperature at which phase change occurs is too high, not only a large-scale heating system is needed, but also loss of heat energy tends to occur. Moreover, as a phase change takes a prolonged time, the waiting time before the printing device is ready for printing is increased. Further, when an emulsion ink, which is referred to later, is used for stencil printing, an ink which changes phase at a temperature of 30°–100° C. is preferred in consideration of the evaporation of water.

The ink which reversibly changes phase and is used in the present invention may be, for example, a wax, a fatty acid amide, a fatty acid ester, or a resin component. Specific examples of the ink include carnauba wax, microcrystalline wax, polyethylene wax, montan wax, paraffin wax, candelilla wax, shellac wax, oxidized waxes, ester waxes, beeswax, Japan wax, spermaceti, stearic amides, lauric amides, behenic amides, caproic amides, palmitic amides, low-molecular polyethylene, polystyrene, a-methylstyrene polymers, polyvinyltoluene, indenes, polyamides, polypropylene, acrylic resins, alkyd resins, polyvinyl acetates, ethylene-vinyl acetate copolymers, and vinyl chloride-vinyl acetate copolymers. These may be used in combinations of two or more.

The ink which changes phase may also contain, in addition to colorants, dispersants, etc. if needed. Examples of colorants include organic and inorganic pigments such as furnace carbon blacks, lamp blacks, cyanine blues, lake reds, cyanine greens, titanium dioxide, and calciun carbonate, and dyes such as azo dyes, anthraquinone dyes, and quinacridone dyes. As dispersants, anionic, cationic, or nonionic dispersants may be used; specific examples of which include sorbitan fatty acid esters, fatty acid monoglycerides, and quaternary ammonium salts.

In the stencil printing of the present invention, the solid ink which is capable of changing phase is heated during printing, and is transformed into a liquid ink having a viscosity within the range of 10–1,000,000 cps, and preferably, 100–100,600 cps. If the viscosity of the ink during printing is excessively low, leakage of ink such as side-leakage of ink and end-leakage of ink cannot be avoided. Moreover, the ink permeates into the printing paper, causing seeping-through. On the other hand, if the viscosity of the ink during printing is excessively high, ink does not pass smoothly through perforations in stencil sheets, resulting in a reduced density of print images or uneven print images.

For heating the ink during printing, any suitable process may be used. For example, ink may be heated using a heater which is directly inserted into the ink for supplying a stencil printing drum. Alternatively, ink may be heated by the application of infrared rays. The temperature for heating ink, which may vary depending on components of the ink, etc., is controlled within the above range.

According to the stencil printing process of the present invention, liquefied ink after undergoing phase change is allowed to pass through perforations made in a stencil sheet and transferred onto an object to be printed. On this occasion, the stencil sheet is pressed against the object to be printed with a contact pressure of 0.01–10 kg/cm$^2$, and preferably 0.05–5 kg/cm$^2$. The time during which ink passes through the perforations is controlled within the range of 0.001–10 seconds, and preferably 0.005–5 seconds. If the contact pressure between the stencil sheet and object to be printed is excessively low, or the time during which the ink passes through perforations is excessively short, the ink in a liquid state does not pass smoothly through the perforations, reducing the volume of ink transferring onto the object to be printed. As a result, print images have reduced density and the prints obtained have uneven print images. On the other hand, if the contact pressure is excessively high, or the time during which the ink passes through perforations is extended, an excessive volume of ink pass through the perforations, increasing the ink transferring onto the object to be printed. Consequently, prints obtain poor clearness or sharpness due to running and dimming. In addition, seeping-through and offsetting tend to occur. In the present invention, good printing results are obtained by prolonging the time during which ink passes through perforations in the cases where the contact pressure between a stencil sheet and an object to be printed is low, and by reducing the time during which ink passes through perforations in the cases where the contact pressure is high.

No particular limitation is imposed on the stencil sheet to be used in the stencil printing of the present invention. Any of pressure-sensitive stencil sheets, heat-sensitive stencil sheets, or soluble stencil sheets may be used. Plate-making of a pressure-sensitive stencil sheet is performed by directly perforating the sheet with a stencil pen, dot matrix printer, etc. so as to trace letters and images. Plate-making of a heat-sensitive stencil sheet is performed by superposing a heat-absorptive manuscript and a stencil sheet and effecting a flash exposure. Alternatively, the heat-sensitive stencil sheet is melted to perforate so as to follow letters and images. Plate-making of a soluble stencil sheet is performed by melting the sheet to form perforations with a solvent injected, for example, from a solvent injecting device so as to contour letters and images.

FIG. 1 is a schematic illustration showing the printing section used in the stencil printing process in accordance with one embodiment of the present invention. In FIG. 1, a stencil sheet 5 which has undergone plate-making so as to reflect letters and images is set on the outer surface of a drum 1 having a lot of through-holes and a diameter of 10 cm. In drum 1 are arranged a squeezing blade 2 for forcing ink against the inner surface of the drum and a heater 3 for heating solid ink as it is supplied. A pressing roller 4 for forwarding a printing paper 6 is also provided so as to contact drum 1.

When stencil printing is performed, solid ink is supplied into the interior part of drum 1, where the ink is heated to a suitable temperature within the range of 30°–150° C. with a heater 3 and is thus converted into liquid ink 7 20 having a viscosity of 10–1,000,000 cps. Simultaneously, the stencil sheet 5 wound on drum 1 is forced against press roller 4 at a pressure of 0.01–10 kg/cm² using the squeezing blade 2 inside drum 1, thereby allowing the liquefied ink 7 to pass through perforations made in the stencil sheet within the time of 0.001–10 seconds for transferring the ink onto the printing paper 6. The ink 7 in a liquid state immediately turns into solid ink 8 and adheres onto the paper while the printing paper is forwarded.

In the stencil printing process of the present invention, water-in-oil (W/O) emulsion ink may be used, containing 10–90% by weight of an oil phase and 90–10% by weight of an aqueous phase, the oil phase comprising a compound capable of reversibly changing phase from a solid state to a liquid state when heated to a temperature of 30°–100° C., preferably 40°–80° C.

The W/O emulsion ink is in a solid state without exhibiting fluidity at a temperature lower than the above range of 30°–100° C., or in other words, lower than the temperature at which the compound capable of causing a phase change starts changing phase, because the oil phase contained in the emulsion is in a solid state. However, when the ink in a solid state is heated to 30°–100° C., the compound capable of changing phase and contained in the oil phase acquires fluidity, rendering the ink into a liquid state. If the compound changes phase at an excessively low temperature, the compound becomes liquefied by the heat of the interior section of the stencil printing device or by ambient temperature, dirtying the printing device or increasing the risk of side-leakage of ink and end-leakage of ink. On the other hand, if the temperature at which phase change occurs is too high, the aqueous phase in the emulsion begins to evaporate, the composition of the emulsion ink varies, and the stability of ink becomes poor.

When the W/O emulsion ink is used in stencil printing, it is heated so as to have a viscosity in the range of 10–1,000,000 cps, and preferably 100–1,000,000 cps. If the viscosity of emulsion ink during printing is too low, side-leakage of ink and end-leakage of ink occur in the printing device. Moreover, the ink permeates into the printing paper, causing seeping-through. On the other hand, if the viscosity is too high, ink does not pass smoothly through perforations in the stencil sheet. As a result, print images have reduced density and the prints obtained have uneven print images.

In the stencil printing process of the present invention, another water-in-oil (W/O) emulsion ink may also be used, containing 10–90% by weight of an oil phase and 90–10% by weight of an aqueous phase, the oil phase comprising a compound capable of reversibly changing phase from a solid state to a liquid state by the application of heat and the aqueous phase comprising a reversibly temperature-sensitive gel polymer.

Since the oil phase of the above W/O emulsion ink contains a compound which reversibly changes phase by the application of heat as described above (preferably at a temperature of 30°–100° C.), when the phase-changeable compound in the oil phase turns solid at a temperature lower than a certain temperature, the whole emulsion ink solidifies. In the case where this type of emulsion ink is used in stencil printing, heat is applied to the ink, thereby imparting fluidity to the ink.

The reversibly temperature-sensitive gel polymer contained in the aqueous phase of the W/O emulsion ink reversibly changes the viscosity of the emulsion ink, i.e., the polymer increases the viscosity of the aqueous phase due to gelation at a temperature higher than a certain temperature, and decreases the viscosity of the aqueous phase at a temperature lower than a certain temperature. Generally speaking, the viscosity of W/O emulsion ink is greatly affected by the change in viscosity of its aqueous phase. Therefore, by mixing a reversibly temperature-sensitive gel polymer in the aqueous phase, decrease in viscosity of ink caused as the temperature elevates can be effectively suppressed. Thus, by the use of such emulsion ink, even when the oil phase containing the above-mentioned phase-changeable compound is heated above the temperature at which phase change occurs to turn into a liquid state and to have a reduced viscosity, it is possible to prevent the viscosity of the whole emulsion ink from varying and to always maintain the ink viscosity at an almost constant level.

Figure 2:
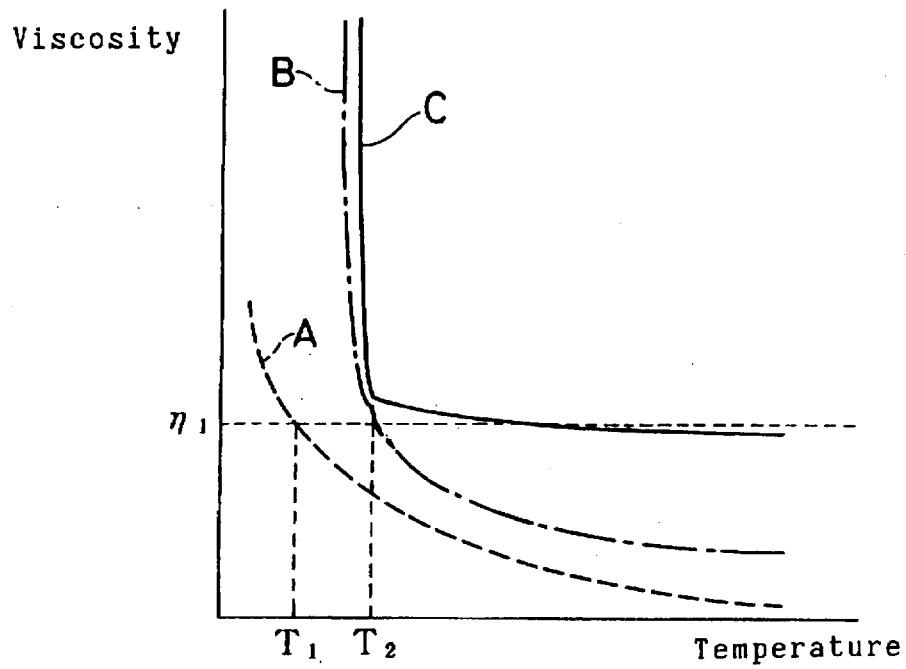
FIG. 2 is a graph showing the relationship between the temperature of W/O emulsion ink and its viscosity.

FIG. 2 is a graph showing the relationship between the temperature of W/O emulsion ink and its viscosity. In FIG. 2, curve A indicates the results obtained from a conventional W/O emulsion ink; curve B from a W/O emulsion ink containing, as an oil phase component, a compound capable of causing a phase change in a reversible manner by the application of heat; and curve C from a W/O emulsion ink containing, as an oil phase component, a compound capable of causing a phase change in a reversible manner by the application of heat and, as an aqueous phase component, a reversibly temperature-sensitive gel polymer.

As shown by curve A, the conventional emulsion ink maintained its optimal ink viscosity for printing($\eta_1$) when the ambient temperature during its use was $T_1$. However, when the ambient temperature during use was lower than $T_1$, ink viscosity increased to impede the smooth ink passage through perforations in the stencil sheet, producing prints containing images with low density. On the other hand, when the ambient temperature during use was higher than $T_1$, ink viscosity decreases and thus higher image densities was obtained. However, seeping-through of ink and end-leakage of ink occurred.

The W/O emulsion ink containing a phase-changeable compound as an oil phase component shown by curve B underwent phase shift between solid and liquid states at a temperature $T_2$. Thus, when the temperature of ink during printing is $T_2$, printing can be performed as the ink is in a liquid state. However, if the temperature of ink is not lower than $T_2$, the ink has a reduced viscosity to invite the risk of seeping-through of ink and end-leakage of ink.

When the emulsion ink containing, as an oil phase, a compound capable of causing a phase change in a reversible manner by the application of heat and, as an aqueous phase component, a reversibly temperature-sensitive gel polymer was tested, this emulsion exhibited characteristics as shown by curve C. Briefly, when the ink of the present invention was heated to a temperature $T_2$, the ink, being a liquid having a viscosity around the optimal viscosity $\eta_1$ was ready for use in printing. When the ink was further heated above the temperature $T_2$, the viscosity of ink did not increase due to the presence of a reversibly temperature-sensitive gel polymer, maintaining the ink viscosity at a proximity to the optimal viscosity ($\eta_1$) for printing. Accordingly, when printing was performed using the emulsion ink of the present invention, consistently stable printing was able to be performed as the viscosity of liquefied ink did not change even when the temperature of ink elevated during printing, without inviting seeping-through of ink, side-leakage of ink and end-leakage of ink in the printing device.

The reversibly temperature-sensitive gel polymer to be incorporated into the aqueous phase of the W/O emulsion ink preferably gelares itself within the temperature range of 30°–100° C. in view of viscosity control necessary for the emulsion ink. Examples of such a polymer include methylcellulose derivatives, poly N-substituted acrylamide derivatives, poly N-substituted methacrylamide derivatives, poly N,N-di-substituted acrylamide derivatives, poly N,N-di-substituted methacrylamide derivatives, polyethylene oxides, polyvinyl methyl ethers, and partially saponified products of polyvinyl alcohol. Specifically, mention may be given to methylcellulose (gelation starting temperature (hereinafter the same applies): 50°–55° C.), hydroxypropylmethylcellulose (60°–70° C.), poly N-isopropylethylacrylamide (31° C.), poly N-isopropylmethacrylamide (44° C.), poly N-cyclopropyl acrylamide (46° C.), poly N-cyclopropyl methacrylamide (59° C.), poly N-methyl-N-ethyl acrylamide (56° C.), poly N,N-diethyl acrylamide (32° C.), poly N-acroyl pyrrolidine (56° C.) and polyethylene oxide (98° C.). These may be used in combination of two or more.

The content of the reversibly temperature-sensitive gel polymer contained in the aqueous phase is preferably 0.01–50% by weight, and more preferably 0.1–20% by weight calculated to the weight of the aqueous phase. If the content is excessively low, viscosity-regulating function of the polymer cannot be expected, whereas if it is excessively high, the initial viscosity of the emulsion ink increases, impeding smooth passing of ink through perforations made in the stencil by plate-making.

The oil phase of the W/O emulsion ink in the present invention may further contain colorants as described hereinabove and emulsifiers in addition to phase-changeable compounds such as the above-listed waxes, fatty acid amides, fatty acid esters, and resins. Emulsifiers are preferably nonionic surfactants; examples of which include sorbitan higher fatty acid esters, fatty acid monoglycerides, higher alcohols, alkyl phenols, and ethylene oxide-added products of fatty acids. The aqueous phase may further contain colorants, resins, humectants, electrolytes, fungicides, and antioxidants, if desired, in addition to water. As colorants, the aforementioned dyes and pigments are used.

The W/O emulsion ink of the present invention may be prepared by adding aqueous phase components, with stirring, to the oil phase components while maintaining the temperature of the oil phase components higher than the temperature at which the phase-changeable compounds starts phase change, thereby causing the resultant mixture emulsified. The content of the aqueous phase components is adjusted to fall within the range of 10–90% by weight, preferably 20–80% by weight, calculated to the total weight of the ink product. If the content of the aqueous phase components is too low, stability in viscosity of the emulsion. ink in a liquid state decreases. On the other hand, if 90% by weight is surpassed, smooth solidification of the ink is impeded.

There is no particular limitation for heating the W/O emulsion ink in a solid state. For example, in cases where printing is performed using a stencil printer, a heating means may be provided at a portion where ink is supplied inside a stencil printing drum, thereby directly heating the ink supplied in a solid state. The temperature is controlled such that. it is higher than the temperature at which the phase-changeable compound contained in the oil phase of the emulsion ink starts phase change and that the ink during printing has a viscosity in a certain range.

Since the W/O emulsion ink of the present invention turns to an emulsion ink having a certain specified viscosity by the application of heat during stencil printing, the ink can pass smoothly through perforations made in a stencil sheet. AfteS undergoing printing, the emulsion ink immediately Changes phase to become solidified while the printed objects are conveyed, and adheres to the printing paper. Thus, if the prints obtained by the process of the present invention are touched by fingers, fingers will not be dirtied by the ink. Moreover, offsetting will not occur when continuous printing is performed. Furthermore, since the ink used in the present invention adheres onto the surface of an object to be printed in a solid state and does not permeate into the object as previously experienced, seeping-through of ink does not occur. In addition, the ink immediately changes phase from a liquid state to a solid state after it is transferred onto printing sheets, printing can be performed not only on usually employed printing paper or post card sheets having poor ink permeability, but also on plastic films and metals.

EXAMPLES

The present invention will next be described in detail by way of example. However, the present invention is not limited by the Examples. "Parts" in the Examples indicate parts by weight.

Example 1

Phase-changeable ink in a solid state was supplied to a drum 1 shown in FIG. 1 and heated to 80° C. using a heater 3 so as to convert it into ink 7 in a liquid state having a viscosity of 1,000 cps. Subsequently, pressure of 1 kg/cm$^2$ was applied to the drum 1 using a squeezing blade 2 and a press roller 4 so as to obtain a nip width of 2 cm. The drum 1 was rotated, and stencil printing was performed while feeding printing paper 6 so that the paper 6 passed through the nip range between the drum 1 and press roller 4 within 0.02 seconds.

The phase-changeable ink in a solid state was prepared by blending 8 parts of furnace carbon black, 30 parts of carnauba wax, 20 parts of an ester wax, and 4 parts of an ethylene-vinyl acetate copolymer and thoroughly kneading the resultant mixture using three rollers preheated to 90° C.

The ink 7 which had changed its phase into a liquid state with the application of heat passed smoothly through perforations made in a stencil sheet 5 and transferred onto the printing paper 6 while it was in a liquid state. The ink on the printing paper 6 immediately changed its phase to become solid ink 8 while the paper was conveyed. Prints with clear and sharp images were obtained. When the prints were rubbed with fingers, the fingers were not dirtied. Moreover, no seeping-through of ink was observed. After 100 prints obtained by continuous printing were superposed one upon another, no offsetting occurred.

Example 2

Stencil printing was performed in a manner similar to that described in Example 1 except that the phase-changeable ink was prepared by blending 10 parts of cyanine blue, 30 parts of carnauba wax, 20 parts of paraffin wax, 7 parts of stearic amide, and 5 parts of a vinyl chloride-vinyl acetate copolymer and thoroughly kneading the resultant mixture using three rollers preheated to 100° C. The phase-changeable ink used in this Example changed phase at 70° C. Prints with clear and sharp images were obtained. Striking through or offsetting did not occur.

Example 3

An oil phase changing phase at 60° C. was obtained by blending 8 parts of furnace carbon black, 30 parts of carnauba wax, 20 parts of an ester wax, 4 parts of an ethylene-vinyl acetate copolymer, and 3 parts of sorbitan monooleate and thoroughly kneading the resultant mixture using three rollers preheated to 90° C.

The oil phase was liquefied by heating it to 70° C. To the resultant liquid, an aqueous phase prepared by blending 3 parts of ethylene glycol, 2 parts of sodium sulfate, and 30 parts of water was added portionwise with stirring for emulsification, obtaining a W/O emulsion ink. This ink solidified after it was allowed to stand at room temperature.

When the emulsion ink in a solid state was heated to 65° C., the ink had a viscosity of 1,000 cps. A stencil sheet which had undergone plate-making to have perforations corresponding to letters was superposed on an official post card. While maintaining the temperature of the emulsion ink at 65° C., the ink was placed on perforations formed in a stencil sheet and squeezed by a blade. As a result, sharp and clear letters were printed on the post card. When the printed portions were touched by fingers, the ink had already become solidified, and thus, fingers were not dirtied. Striking through of ink was scarcely observed. After 50 prints obtained by continuous printing were superposed one upon another, no offsetting occurred.

Example 4

Emulsion ink was prepared in a manner similar to that described in Example 3 except that the oil phase components were 8 parts of furnace carbon black, 30 parts of paraffin wax, 15 parts of montan wax, 4 parts of an ethylene-polyvinyl acetate copolymer, and 2 parts of sorbitan monooleate. The temperature at which the oil phase changed phase was 55° C.

When the resultant solid emulsion was heated to 60° C., it had a viscosity of 5,000 cps. While maintaining the temperature of the ink at 60° C., the ink was placed on perforations in a stencil sheet and squeezed by a blade so as to transfer the ink onto a post card made by a synthetic paper Yupo (manufactured by Oji Yuka K. K.). As a result, sharp and clear letters were printed on the post card. When the printed portions were touched by fingers, the ink had already become solidified, and thus, fingers were not dirtied.

Example 5

A phase-changeable oil phase which changed phase at 70° C. was prepared by blending 10 parts of cyanine blue, 30 parts of carnauba wax, 20 parts of paraffin wax, 7 parts of stearic amide, 5 parts of a vinyl chloride-vinyl acetate copolymer, and 3 parts of sorbitan monooleate and thoroughly kneading the resultant mixture using three rollers preheated to 100° C.

The thus-obtained oil phase was heated to 80° C. to liquefy. To the resultant liquid, an aqueous phase containing 30 parts of ethylene glycol, 2 parts of sodium sulfate, and 20 parts of water was added portionwise with stirring for emulsification, obtaining a W/O emulsion ink. This ink solidified after it was allowed to stand at room temperature.

When the emulsion ink in a solid state was heated to 80° C., the ink had a viscosity of 10,000 cps. While maintaining the temperature of the ink at 80° C., stencil printing was performed on 100 high-quality papers continuously as described in Example 3, As a result, prints with clear and sharp images were obtained, and after the prints were superposed one upon another, seeping-through or offsetting did not occur. In addition, ink leaked from edges of the stencil sheet solidified, and thus, no side-leakage of ink occurred.

Example 6

A phase-changeable oil phase which changed phase at 50° C. was prepared by blending 8 parts of furnace carbon black, 40 parts of paraffin wax, 10 parts of Japan wax, 4 parts of an ethylene-vinyl acetate copolymer, and 3 parts of sorbitan monooleate and thoroughl.y kneading the resultant mixture using three rollers preheated to 80° C.

While keeping the above oil phase in a liquid state at 60° C., an aqueous phase containing 5 parts of poly N-cyclopropyl methacrylamide, 2 parts of ethylene glycol, and 28 parts of water was added thereto portionwise with stirring for emulsification, obtaining a W/O emulsion ink. This ink solidified after it was allowed to stand at room temperature.

While maintaining the temperature of the ink at 55° C., the ink was placed on the perforations of a stencil sheet which had undergone plate-making to have perforations corresponding to letters, and the stencil sheet with ink thereon was superposed on an official post card. Squeezing with a blade from the upper side of the stencil sheet yielded a printed post card with sharp and clear letters. When the printed portions of the post card were touched by fingers immediately after printing, the ink had already become solidified, and thus, fingers were not dirtied. Striking through of ink was scarcely observed. After 50 prints obtained by continuous printing were superposed one upon another, no offsetting occurred. When stencil printing was repeated while maintaining the temperature of the ink at 65° C., similar results were obtained.

Example 7

Emulsion ink was prepared in a manner similar to that described in Example 6 except that the oil phase components were 8 parts of furnace carbon black, 30 parts of paraffin wax, 15 parts of montan wax, 5 parts of an ethylene-polyvinyl acetate copolymer, and 2 parts of sorbitan monooleate. The temperature at which this oil phase changed phase was 55° C.

While keeping the above oil phase in a liquid state at 60° C., an aqueous phase containing 7 parts of hydroxypropylmethylcellulose, 2 parts of ethylene glycol, and 31 parts of Water was added thereto portionwise with stirring for emulsification, obtaining a W/O emulsion ink. This ink solidified after it was allowed to stand at room temperature.

While maintaining the temperature of the ink at 60° C. or 80° C., the ink was placed on the perforations of a stencil sheet which had undergone plate-making to have perforations corresponding to letters, and the stencil sheet with ink thereon was superposed on a post card made of a synthetic.paper Yupo (manufactured by Oji Yuka K. K.). Squeezing with a blade from the upper side of the stencil sheet yileded a printed post card with sharp and clear letters in either case of 60° C. and 80° C. When the printed portions of the post cards obtained in both temperature cases were touched by fingers immediately after printing, fingers were not dirtied.

Example 8

A phase-changeable oil phase which changed phase at 70° C. was prepared by blending 10 parts of cyanine blue, 30 parts of carnauba wax, 20 parts of paraffin wax, 7 pars of stearic amide, 5 parts of a vinyl chloride-vinyl acetate copolymer, and 3 parts of sorbitan monooleate and thoroughly kneading the resultant mixture using three rollers preheated to 100° C.

While keeping the above oil phase in a liquid state at 80° C. an aqueous phase containing 5 parts of polyethylene oxide, 2 parts of ethylene glycol, and 18 parts of water was added thereto portionwise with stirring for emulsification, obtaining a W/O emulsion ink. This ink solidified after it was allowed to stand at room temperature.

The ink was stirred while maintaining the temperature at 80° C. or 100° C., and stencil printing was continuously performed as described in Example 6 on 100 high-quality papers. As a result, in both temperature cases of 80° C. and 100° C., prints with sharp and clear images were obtained without causing seeping-through or offsetting. In addition, ink leaked from edges of the stencil sheet became solid, and thus, no side-leakage of ink occurred.

As described above, according to the stencil printing process of the present invention, stencil printing is performed under specified conditions using reversibly phase-changeable ink, i.e., ink which is capable of changing phase from a solid state to a liquid state by the application of heat during printing and from a liquid phase to a solid phase, in an immediate manner, when the printed material is conveyed after undergoing printing, prints with sharp and clear images.can be obtained without causing offsetting and seeping-through. Thus, stencil printing with enhanced productivity is achieved.

The emulsion ink used for stencil printing in the present invention is capable of producing prints in which ink dries quickly, and offsetting and seeping-through are prevented. Moreover, since fingers are not dirtied even when they touch the printed portions of the resultant prints immediately after printing, stencil printing can be performed with high efficiency. In addition, by incorporating a reversibly temperature-sensitive gel polymer into an aqueous phase of an emulsion ink for stencil printing, even when the temperature of ink rises during printing, increase in viscosity can be prevented. Thus, prints with excellent quality are obtained.

What is claimed is:

1. A stencil printing process for printing an object to be printed by passing an ink through perforations made in a stencil sheet which has undergone plate-making, comprising the following steps:

rendering a solid ink capable of causing a phase change into a liquid state at a temperature of 30°–80° C. into a liquid ink having a viscosity of 10–1,000,000 cps with the application of heat; and passing the liquid ink through the perforations made in the stencil sheet within a time of 0.001–10 seconds while pressing the stencil sheet against the object to be printed with a pressure of 0.01–10 kg/cm$^2$ so as to transfer the ink onto the object.

2. A stencil printing process according to claim 1, wherein said solid ink is a water-in-oil (W/O) emulsion ink for stencil printing comprising 10–90% by weight of an oil phase and 90–10% by weight of an aqueous phase, the oil phase containing a compound capable of causing a phase change from a solid state to a liquid state by being heated to a temperature of 30°–80° C.

3. A stencil printing process according to claim 1, wherein said solid ink is a water-in-oil (W/O) emulsion ink for stencil printing comprising 10–90% by weight of an oil phase and 90–10% by weight of an aqueous phase, the oil phase containing a compound capable of causing a reversible phase change with the application of heat, and the aqueous phase containing a reversibly temperature-sensitive gel polymer which viscosity in a liquid state reversibly elevates while the gel polymer is heated.

4. A stencil printing process according to claim 3, wherein said reversibly temperature-sensitive gel polymer causes gelation within the temperature range of 30°–80° C.

5. A stencil printing process according to claim 4, wherein the amount of the reversibly temperature-sensitive gel polymer in the aqueous phase is from 0.01–50% by weight calculated to the total weight of the aqueous phase.

6. A stencil printing process according to claim 3, wherein the amount of the reversibly temperature-sensitive gel polymer in the aqueous phase is from 0.01–50% by weight calculated to the total weight of the aqueous phase.

* * * * *